(12) United States Patent
Takahashi et al.

(10) Patent No.: US 7,144,838 B2
(45) Date of Patent: Dec. 5, 2006

(54) PROCESS FOR PRODUCTION OF TITANIUM DIOXIDE PIGMENT AND RESIN COMPOSITION CONTAINING THE PIGMENT

(75) Inventors: Hideo Takahashi, Yokkaichi (JP);
Toshihiko Akamatsu, Yokkaichi (JP);
Yuji Shigeno, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 80 days.

(21) Appl. No.: 10/507,172

(22) PCT Filed: Mar. 10, 2003

(86) PCT No.: PCT/JP03/02801

§ 371 (c)(1),
(2), (4) Date: Sep. 10, 2004

(87) PCT Pub. No.: WO03/076524

PCT Pub. Date: Sep. 18, 2003

(65) Prior Publication Data

US 2005/0129602 A1    Jun. 16, 2005

(30) Foreign Application Priority Data

Mar. 13, 2002    (JP)    ............... 2002-069074

(51) Int. Cl.
*B01J 31/00*    (2006.01)

(52) U.S. Cl. .................. 502/103; 106/447; 423/274; 427/212

(58) Field of Classification Search ........... 106/447; 423/274; 427/212; 502/103
See application file for complete search history.

(56) References Cited

U.S. PATENT DOCUMENTS

| | | | | |
|---|---|---|---|---|
| 5,458,680 A | * | 10/1995 | Shurling et al. | 106/487 |
| 5,648,416 A | * | 7/1997 | Miller et al. | 524/500 |
| 5,853,621 A | * | 12/1998 | Miller et al. | 252/500 |
| 6,197,105 B1 | * | 3/2001 | Freeman et al. | 106/487 |
| 6,534,044 B1 | * | 3/2003 | Wada et al. | 424/59 |
| 6,576,052 B1 | * | 6/2003 | Takahashi et al. | 106/443 |
| 6,623,557 B1 | * | 9/2003 | Hayashi et al. | 106/499 |
| 6,808,808 B1 | * | 10/2004 | Freeman et al. | 428/405 |
| 6,899,757 B1 | * | 5/2005 | Chang et al. | 106/415 |

FOREIGN PATENT DOCUMENTS

| | | |
|---|---|---|
| JP | 10-324817 | 12/1998 |
| JP | 2001-106939 | 4/2001 |
| JP | 2001-181136 | 7/2001 |
| WO | WO 01/44111 | 6/2001 |

\* cited by examiner

*Primary Examiner*—J. A. Lorengo
*Assistant Examiner*—Jennine Brown
(74) *Attorney, Agent, or Firm*—Paul E. White, Jr.; Manelli Denison & Selter PLLC

(57) ABSTRACT

The present invention relates to a process for producing titanium dioxide pigment, which comprises a step of coating hydrolysis product of an alkylsilane compound represented by the following formula (1):

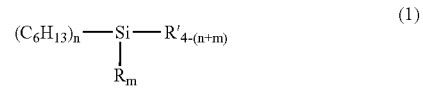

(where R is an alkyl group having 5 or less carbon atoms, R' is a hydrolyzable group, and n is an integer of 1 to 3, m is an integer of 0 to 2, and n+m≦3) by dry processing on surfaces of particles of titanium dioxide pigment. The present invention provides titanium dioxide pigment with distinguished hydrophobic property, dispersibility, and heat resistance.

11 Claims, No Drawings

PROCESS FOR PRODUCTION OF TITANIUM DIOXIDE PIGMENT AND RESIN COMPOSITION CONTAINING THE PIGMENT

TECHNICAL FIELD

The present invention relates to a process for producing titanium dioxide pigment with distinguished processing characteristics and dispersibility into the plastic system and a resin composition comprising the titanium dioxide pigment produced by the process.

BACKGROUND ART

The titanium dioxide pigment is hydrophilic, so that its affinity toward organic resins is low and its dispersibility and filling ability into the plastic system are low. Particularly, in case of thin film processing, lacing (foaming) or pinholes are liable to occur due to water contained in the titanium dioxide pigment. In this connection, it is known to coat the surface of titanium dioxide pigment with an organic silicone compound to give an affinity toward plastic resins and a hydrophobic property both thereto.

Among the organic silicone compounds, hydrolyzable alkylsilane compounds are widely used in the plastic resin field. This is because the hydroxyl groups of hydrolysis products react with the hydroxyl groups present on the surface of titanium dioxide pigment to form chemical bonding, thereby effectively improving the hydrophobic property of titanium dioxide pigment and the affinity toward plastic resins. Further, the alkyl groups of the hydrolysis products on the other hand are inert toward the organic compounds, and have distinguished selectivity to plastic resin species.

However, generally the hydrolysis products of hydrolyzable alkylsilane compounds with a distinguished hydrophobic property have a low heat resistance, and the titanium dioxide pigment coated therewith has such problems that the pigment powder turns yellowish by heating in the drying and pulverizing steps and furthermore the plastic moldings also turn yellowish.

DISCLOSURE OF THE INVENTION

The present invention is to overcome the aforementioned problems of the prior art and provide a process for producing titanium dioxide pigment with a distinguished balance among the hydrophobic property (that is, affinity toward resins), the dispersibility, and the heat resistance, and particularly with suitable application to plastic thin film processing and also provides a resin composition comprising the titanium dioxide pigment produced by the process.

As a result of extensive studies to solve the problems, the present inventors have found that the titanium dioxide pigment can be given distinguished hydrophobic property and dispersibility and also a distinguished heat resistance by coating a hydrolysis product of a specific organosilicone compound on the surfaces of particles of titanium dioxide pigment by dry processing, and have established the present invention.

That is, the present invention provides a process for producing titanium dioxide pigment, characterized by coating a hydrolysis product of an alkylsilane compound represented by the following formula (1):

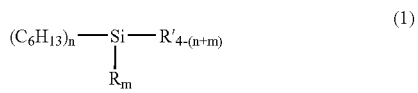

[R is an alkyl group having 5 or less carbon atoms, R' is a hydrolizable group, n is an integer of 1 to 3, m is an integer of 0 to 2, and n+m≤3] by dry processing on surfaces of particles of titanium dioxide pigment.

BEST MODE FOR CARRYING OUT THE INVENTION

The present invention provides a process for producing titanium dioxide pigment, characterized by coating a hydrolysis product of an alkylsilane compound represented by the formula (1) on surfaces of particles of titanium dioxide pigment by dry processing. When the alkyl group of alkylsilane compound has 7 or more carbon atoms, the heat resistance will be considerably lowered. Even wet processing with an alkylsilane compound having 6 carbon atoms was tried, but was found the hydrophobic property and dispersibility unsatisfactory.

In the present invention, it seems that chemical reaction and bonding of the hydrolysis product of an alkylsilane compound with the hydroxyl groups present on the surface of titanium dioxide pigment can be made liable to occur by dry processing and the surface of hydrophilic titanium dioxide pigment can be fully coated with the hydrolysis product of the alkylsilane compound thereby.

That is, titanium dioxide pigment with high hydrophobic property and affinity toward plastic resin can be obtained, when at least one alkyl group has 6 carbon atoms, even if other alkyl groups have not more than 5 carbon atoms, as shown by the alkylsilane compound represented by the formula (1). In case of an alkylsilance compound, all of whose alkyl groups have not more than 5 carbon atoms [a case of n=0 and m=3 in the formula (1)] the hydrophobic property and the affinity to organic compounds are low, and any desired characteristics cannot be obtained even by dry processing.

Hydrolizable group (R' in the formula) is not particularly limited and many be a halogen group, a hydroxyl group, etc., but preferably is an alkoxy group, which is hard to generate harmful secondary products and having a distinguished stability. It is more desirable that the alkoxy group is a methoxy group or an ethoxy group because of the distinguished hydrolizability. Furthermore, it is desirable that n+m in the formula is 1 or 2 because the reaction sites with the hydroxyl group present on the surface of the titanium dioxide pigment are more available.

Specific examples of the alkylsilane compounds include hexyltrimethoxysilane, hexyltriethoxysilane, hexylmethyldimethoxysilane, hexylmethyldiethoxysilane, etc., which can be used alone or in a combination of at least two thereof.

In the present invention, the hydrolysis product refers to silanol produced by hydrolysis of the hydrolizable group of alkylsilane compound, or oligomers or polymers having siloxane bonds produced by polycondensation of silanols themselves, and may contain a portion of unreacted alkylsilane compounds in such a range as not to spoil the object of the present invention.

The dry processing is defined as a method for coating the particle surface of titanium dioxide pigment with the hydrolysis product of an alkylsilane compound by contacting the titanium dioxide pigment with the alkylsilane compound or its hydrolysis product in a gas phase. So long as the coating treatment is conducted by contacting these two with each other in a gas phase, such coating treatment falls under the above-defined dry processing. In other words, it is not necessary that the titanium dioxide pigment, the alkylsilane compound and the hydrolysis product of the alkylsilane compound are in a dry state.

When coating with the hydrolysis product of an alkylsilane compound represented by the formula (1) is carried out, for example, by the so-called wet processing in which the titanium dioxide pigment is contact with the alkylsilane compound in a liquid medium such as water, an organic solvent, etc., hydrolysis rate of alkylsilane compound is lowered, or even if hydrolyzed, polycondensation of silanols themselves preferentially proceeds, or reactivity of silanols with the hydroxyl groups present on the surface of the titanium dioxide pigment is lowered in an alkaline range of slurry pH, making the coating with the hydrolysis product hard to conduct. Further, in a neutral to acidic range of slurry pH, the titanium dioxide pigment coagulates by itself and precipitated or the slurry viscosity increases, accordingly, in industrial scale, mixing and stirring become hard and thus uniform coating is hard to obtain.

The dry processing may be carried out by mixing the titanium dioxide pigment and the hydrolysis product of an alkylsilane compound together in a high speed stirrer, etc., but ① when the titanium dioxide pigment is pulverized in a fluid energy pulverizer using a gas as a pulverizing medium, the hydrolysis product of an alkylsilane compound prepared in advance is added to the pulverizer, or ② when the pigment is pulverized in a fluid energy pulverizer using steam as a pulverizing medium, an alkylsilane compound itself is added to the pulverizer, where pulverization of the pigment and coating treatment can be carried out at the same time. This is preferable.

It is preferable to use a swirl flow type pulverizer such as a jet mill as a fluid energy pulverizer because of a good pulverization efficiency and a distinguished inter-miscibility. In case of procedure ①, a gas as a pulverizing medium can be air, steam, etc., and is not particularly limited. In case of procedure ②, the alkylsilane compound reacts with steam to produce hydrolysis product, which successively coats titanium dioxide pigment. Quantity and pressure of steam for effectively carrying out the hydrolysis of the alkylsilane compound can be experimentally determined.

It is preferable to set the temperature of dry processing to 120°–300° C., because the reaction of the hydrolysis product of an alkylsilane compound with the hydroxyl groups present on the surface of titanium dioxide pigment can further proceed to attain more uniform coating. To conduct the dry processing in the aforementioned temperature range, the pulverizer inside is heated to the aforementioned temperature range in advance or the gas as a pulverizing medium is heated to the aforementioned temperature range in advance.

To prepare the hydrolysis product in advance in the procedure ①, it is recommended to mix the alkylsilane compound with water, and the concentration of the liquid mixture is set to a range of preferably 5–95 wt. %, more preferably 60–95 wt. %. It is preferable to adjust pH of water or the liquid mixture to a neutral to acidic range, because the hydrolysis can proceed efficiently. In an acidic range, polycondensates of hydrophobic hydrolysis product will be hard to form, and thus the mixture can be easily handled as an aqueous liquid mixture. Thus, the pH is adjusted preferably to a range of 0.5–6, more preferably 1.5–4. Even in a neutral range, addition of a compatible agent such as a lower alcohol, etc. thereto can facilitate handling of the mixture as an aqueous liquid mixture. The hydrolysis product can be used as such, but when it contains a considerable quantity of water, it is preferable to decrease the quantity of water beforehand.

A proportion of the hydrolysis product of an alkylsilane compound for use in the dry processing is preferably 0.01–3.0 wt. %, more preferably 0.02–1.0 wt. %, in terms of the alkylsilane compound, on the basis of the titanium dioxide pigment. When the proportion is less than the lower limit value, any desired effect can not be obtained, whereas above the upper limit value any expectable effect, which corresponds to the addition of such excess proportion of the alkylsilane compound, cannot be obtained. This is economically disadvantageous.

In the present invention, it is preferable for attaining desirable characteristics, for example, improvements in weather resistance, a light resistance, etc., or improvements in productivity, etc. to use particles of titanium dioxide pigment provided with a coating layer of an inorganic compound on the surfaces in advance in such a range as not to spoil the object of the present invention. Such inorganic compounds include, for example, hydrated oxides of aluminum, silicon, tin, zirconium, etc, or their phosphates such as aluminum phosphate, etc., so far well known in this technical field. The coating can be made with a combination of at least two thereof. It is not necessary to coat the entire surface of the titanium dioxide pigment with the inorganic compound. That is, the titanium dioxide pigment may have partially uncoated surfaces within such a range that the desired characteristics can be obtained. The larger the total coating amount of the inorganic compound, the more liable a porous coating layer is to be formed to make the pigment hygroscopic. Above all, the hydrated oxides contain bound water, making the water quantity of the titanium dioxide pigment higher. In case of molding plastic resin compound comprising such titanium dioxide pigment, particularly in case of molding the resin into thin films, processing failure due to the contained water is liable to occur. Thus, it is preferable that the total coating amount is made as small as possible. The specific upper limit of the total coating amount depends on the species of the inorganic compound, but the maximum is preferably, for example, 1.0 wt. % each of the hydrated oxide of aluminum in terms of $Al_2O_3$, the hydrated oxide of silicon in terms of $SiO_2$, and the phosphate of aluminum in terms of $Al_2PO_4$, on the basis of the titanium dioxide pigment. The desired characteristics can be obtained well, if the total coating amount is at least 0.01 wt. %, and thus a range of 0.01 to 1.0 wt. % is more preferable.

The titanium dioxide pigment without the coating layer of an inorganic compound generally has a low light resistance, and thus plastic resin containing such titanium dioxide pigment without the coating layer undergoes discoloration or fading upon exposure to ultraviolet rays, or its decomposition is easily promoted. In the present invention it is desirable to use titanium dioxide pigment provided with a coat layer of hydrated oxide of aluminum in advance. Coating with hydrated oxide of aluminum can facilitate such operations as dehydration, drying, pulverization, etc. in the steps of producing titanium dioxide pigment, and thus such coating is also industrially desirable.

A coating amount of hydrated oxide of aluminum is preferably in a range of 0.01 to 1.0 wt. %, more preferably 0.05 to 0.5 wt. % in terms of $Al_2O_3$ on the basis of titanium dioxide pigment. Below 0.01 wt. % the desired light resistance is hard to obtain, whereas above 1.0 wt. % a processing failure due to the bound water contained in the hydrated oxide is liable to occur in case of plastic molding where plastic resin comprising the titanium dioxide pigment is processed into thin films.

Coating with hydrated oxide of aluminum can be carried out according to well known methods. For example, any of methods of (1) adding an aqueous solution of an aluminum compound to an aqueous slurry of titanium dioxide pigment in dispersion, followed by adjustment of pH to 4–9 with an aqueous solution of an acidic compound or a basic compound, and (2) adding an aqueous solution of an acidic compound or a basic compound to an aqueous slurry of titanium dioxide pigment, followed by addition of an aqueous solution of an aluminum compound to the slurry while keeping pH in the aforementioned range. After the coating, recovery by filtration, washing, drying, etc. are carried out, if necessary.

Concentration of titanium dioxide pigment as solid matters in the aqueous slurry is in a range of 50–800 g/l, preferably 100–500 g/l. At a higher concentration than 800 g/l, the viscosity of the aqueous slurry is so high that uniform coating of the surfaces of particles of titanium dioxide pigment with the hydrated oxide of aluminum will be hard to conduct, whereas at a lower concentration than 50 g/l the industrial scale operability will be lowered.

The aluminum compound for this purpose includes, for example, sodium aluminate, aluminum sulfate, aluminum nitrate, aluminum chloride, etc. For the pH adjustment, acidic compounds including inorganic acids such as sulfuric acid, hydrochloric acid, etc. and organic acids such as acetic acid, formic acid, etc., and inorganic basic compounds such as sodium hydroxide, potassium hydroxide, ammonia, etc. can be used.

The titanium dioxide pigment produced in the present invention has an average particle size in a range of 0.1–0.4 μm (measured by electron microscopic picture), and a range of 0.1–0.25 μm is preferable. Crystal types of anatase type or rutile type can be used in the present invention, and a mixture of both types can also be used. Process for producing particles of titanium dioxide pigment for use in the present invention is not particularly limited. The particles can be obtained, for example, by the so called sulfate process of hydrolyzing a solution of titanium sulfate, or by the so called chloride process of gas phase oxidation of titanium halide.

The titanium dioxide pigment produced in the present invention has a dispersibility of not more than 20 kg/cm$^2$. The dispersibility herein referred to is determined in the following procedure:

(Evaluation Procedure for Dispersibility)

500 g of titanium dioxide pigment, 500 g of freeze-pulverized polyethylene resin (Sumikacene L-705, made by Sumitomo chemical Co., Ltd.), and 20 g of lead stearate are mixed together in a juice mixer for 5 minutes. The mixture is melt extruded through a Labo Plastomill biaxial extruder, made by Toyo Seiki Seisaku-sho, Ltd., over one hour, while setting the resin temperature to 280° C. and providing a 1,450-mesh screen at the discharge end. Resin pressure both at the time of initiation of extrusion and at the time of extrusion for one hour are measured, and a difference in the resin pressure therebetween is defined as a dispersibility.

The present invention also provides a resin composition, characterized by comprising the aforementioned titanium dioxide pigment and plastic resin. The resin composition can give moldings substantially free from processing failures such as lacing, pinholes, etc. or projections of poorly dispersed particles of titanium dioxide pigment from the molding surface and thus with distinguished surface smoothness and gloss.

The plastic resin for use in the present invention includes, for example, thermoplastic resins such as polyolefin resin, polyvinyl chloride resin, polystyrene resin, ABS resin, engineering plastics, etc., and thermo-setting resins such as phenol resin, urethane resin, unsaturated polyester resin etc., and various plastic resins can be used without any particular restriction.

Mixing proportion of the titanium dioxide pigments to the plastic resin is not particularly limited, but the titanium dioxide pigment is used in a range of 0.01–900 parts by weight, preferably 0.1–200 parts by weight, on the basis of 100 parts by weight of the plastic resin. Various additives or fillers well known to those skilled in the art, such as a stabilizer, a dispersing agent, a lubricant, an antioxidant, an ultraviolet ray-absorbing agent, a reinforcing agent, a loading material, etc. can be added to the resin composition, depending on the desired use.

The present resin composition can be obtained by mixing the titanium dioxide pigment with molten plastic resin with a kneader. The kneader for this purpose is the ordinary one such as an intensive mixer, e.g. a uniaxial extruder, a biaxial extruder, a Banbury mixer, etc., a roll mill etc.

EXAMPLES

The present invention will be described in detail below, referring to Examples, which are merely to illustrate embodiments of the present invention and are not constructed as restrictive of the scope of the present invention.

Example 1

(Coating with Hydrated Oxide of Aluminum)

Rutile type titanium dioxide pigment having an average particle size of 0.20 μm was mixed with water to prepare an aqueous slurry containing 300 g/l of titanium dioxide. While keeping the slurry at 60° C., 0.30% of sodium aluminate in terms of $Al_2O_3$ was added with stirring to the slurry on the basis of the weight of the titanium dioxide pigment, followed by neutralization to pH 5.0 with sulfuric acid to coat the pigment with the hydrated oxide of aluminum, and further followed by recovery by filtration, washing and drying at 120° C. for 10 hours.

(Coating with Hydrolysis Product of Alkylsilane Compound)

The above-mentioned titanium dioxide pigment was pulverized in a fluid energy pulverizer, using steam heated to 250° C. (in an amount by weight 2.2 times as larger as that of the titanium dioxide pigment under steam pressure of 1.4 MPa) as a pulverizing medium, while 1.0 wt. % of hexyltriethoxysilane on the basis of the titanium dioxide pigment was added to the pulverizer during the pulverization, thereby dry processing the surfaces of particles of the titanium dioxide pigment with the hydrolysis product of hexyltriethoxysilane. The resulting titanium dioxide pigment will be hereinafter referred to as Sample A.

Example 2

Hydrolysis product of hexyltriethoxysilane was subjected to dry processing on the surfaces of particles of titanium dioxide pigment in the same manner as in Example 1, except that the hydrolysis product of hexyltriethoxysilane in an amount corresponding to 1.0 wt. % in terms of hexyltriethoxysilane on the basis of the titanium dioxide pigment was added to the pulverizer. The resulting titanium dioxide pigment will be hereinafter referred to as Sample B. The hydrolysis product of hexyltriethoxysilane was prepared by adding 1 part by weight of water, which was adjusted to pH 2 with sulfuric acid in advance, to 9 parts by weight of hexyltriethoxysilane with stirring, and used as such.

Example 3

Hydrolysis product of hexyltrimethoxysilane was subjected to dry processing on the surfaces of particles of titanium dioxide pigment in the same manner as in Example 1 except that hexyltrimethoxysilane was used in place of hexyltriethoxysilane. The resulting titanium dioxide pigment will be hereinafter referred to as Sample C.

Example 4

Hedrolysis product of hexyltrimethoxysilane was subjected to dry processing on the surfaces of particles of titanium dioxide pigment in the same manner as in Example 2 except that the hydrolysis product of hexyltrimethoxysilane was used in place of the hydrolysis product of hexyltriethoxysilane. The resulting titanium dioxide pigment will be hereinafter referred to as Sample D.

Example 5

Hydrolysis product of hexylmethyldiethoxysilane was subjected to dry processing on the surfaces of particles of titanium dioxide pigment in the same manner as in Example 1 except that hexylmethyldiethoxysilane was used in place of hexyltriethoxysilane. The resulting titanium dioxide pigment will be hereinafter referred to as Sample E.

Example 6

Hydrolysis product of hexylmethyldiethoxysilane was subjected to dry processing on the surfaces of particles of titanium dioxide pigment in the same manner as in Example 2 except that the hydrolysis product of hexylmethyldiethoxysilane was used in place of the hydrolysis product of hexyltriethoxysilane. The resulting titanium dioxide pigment will be hereinafter referred to as Sample F.

Comparative Example 1

Titanium dioxide pigment (Sample G) was obtained in the same manner as in Example 1 except that the hexyltriethoxysilane was not used.

Comparative Example 2

Titanium dioxide pigment (Sample H) was obtained in the same manner as in Example 1 except that octyltriethoxysilane was used in place of hexyltriethoxysilane.

Comparative Example 3

Titanium dioxide pigment (Sample I) was obtained in the same manner as in Example 1 except that butyltriethoxysilane was used in place of hexyltriethoxysilane.

Comparative Example 4

After coating with hydrated oxide of aluminum in Example 1, the resulting aqueous slurry was adjusted to pH 9 with sodium hydroxide, and then 1.0 wt. % of hexyltriethoxysilane on the basis of the titanium dioxide pigment was added to the aqueous slurry, followed by stirring for 2 hours. Then, the pH was adjusted to 5 with sulfuric acid, followed by recovery by filtration, washing, drying at 120° C. for 10 hours, and pulverization in a fluid energy pulverizer, whereby titanium dioxide pigment (Sample J) was obtained.

Comparative Example 5

Titanium dioxide pigment (Sample K) was obtained in the same manner as in Comparative Example 4 except that the hexyltriethoxysilane was replaced with the hydrolysis product of hexyltriethoxysilane as used in Example 2.

Comparative Example 6

Titanium dioxide pigment (Sample L) was obtained in the same manner as in Example 1 except that decyltriethoxysilane was used in place of hexyltriethoxysilane.

Evaluation 1 (Karl Fischer Water Quantity)

Samples A to K obtained in Examples 1 to 6 and Comparative Examples 1 to 5 were left to stand at constant temperature and humidity (temperature: 25° C. and relative humidity: 55%) for 24 hours, and after they were brought in an equilibrium state, 1 g each of samples was subjected to determination of Karl Fischer water quantity at 100° C. and 300° C. by a Karl Fischer water quantitative analyzer and its accessory water vaporizer (both being made by Mitsubishi Chemical Corp.)

Evaluation 2 (Dispersibility)

Samples A to L obtained in Examples 1 to 6 and Comparative Examples 1 to 5 were subjected to determination increases in resin pressure to evaluate a dispersibility according to the procedure for evaluating a dispersibility as described before.

Evaluation 3 (Lacing Resistance)

At the time of the above-mentioned dispersibility test, a strand die was provided at the discharge end of the Labo Plastomill to visually observe the molten product discharged from the strand and evaluate the lacing resistance on the basis of foaming state. Evaluation standard is as follows:
Evaluation ◎: No foaming was observed at all.
Evaluation ○: Foaming was slightly observed.
Evaluation Δ: Foaming was partially observed.
Evaluation X: Foaming was observed throughout.

Evaluation 4 (Heat Resistance)

4 g each of Samples A to K obtained in Examples 1 to 6 and Comparative Examples 1 to 5 was individually filled in an aluminum ring, 38 mm in outer diameter, 33 mm in inner diameter and 5 mm in thickness, and subjected to compression molding under pressure of 147 MPa for 5 seconds by a press, and then the resulting moldings were heated at 300° C. for 10 minutes. Hunter color system (L, a, b) of the moldings before and after the heating were determined by a color computer (Model SM-5 made by Suga Test Instruments Co., Ltd.) to compute color difference $\Delta E = \{(\Delta L)^2 + (\Delta a)^2 + (\Delta b)^2\}^{1/2}$. The larger $\Delta E$, the more considerable discoloration and the poorer the heat resistance.

Evaluation results of water quantity, lacing resistance, dispersibility and heat resistance are shown in Table 1. It is evident therefrom that the titanium dioxide pigment obtained by the present process has distinguished hydrophobic property, dispersibility and processing characteristics. Furthermore, it is evident therefrom that the present resin composition can give moldings with distinguished appearance substantially without lacing.

TABLE 1

| | Sample | water quantity (ppm) 100° C. | water quantity (ppm) 300° C. | Dispersibility (kg/cm$^2$) | Lacing resistance | Heat resistance ΔE |
|---|---|---|---|---|---|---|
| Ex. 1 | A | 1200 | 2500 | 5 | ⊚ | 3.0 |
| Ex. 2 | B | 1200 | 2500 | 5 | ⊚ | 3.0 |
| Ex. 3 | C | 1200 | 2500 | 5 | ⊚ | 3.0 |
| Ex. 4 | D | 1200 | 2500 | 5 | ⊚ | 3.0 |
| Ex. 5 | E | 1200 | 2500 | 5 | ⊚ | 3.0 |
| Ex. 6 | F | 1200 | 2500 | 5 | ⊚ | 3.0 |
| Comp. Ex. 1 | G | 3000 | 5000 | 200 and more | X | 0.5 |
| Comp. Ex. 2 | H | 1100 | 2600 | 5 | ⊚ | 5.0 |
| Comp. Ex. 3 | I | 1500 | 3200 | 30 | Δ | 2.0 |
| Comp. Ex. 4 | J | 2000 | 3200 | 100 and more | Δ | 2.0 |
| Comp. Ex. 5 | K | 1800 | 2800 | 30 | ○ | 3.0 |
| Comp. Ex. 6 | L | 1100 | 2600 | 5 | ⊚ | 7.0 |

Evaluation 5 (Powder Color)

Samples A, G and L obtained in Example 1, and Comparative Examples 1 and 6, were subjected to compression molding in the same manner as in Evaluation 4, and powder color of the resulting moldings was measured in terms of Hunter color system (L, a, b) by a color computer (Model SM-5, made by Suga Test Instruments Co., Ltd.). The lower the L value, the lower the whiteness, whereas the higher the b value the more yellowish the color tone.

Evaluation results of powder color are shown in Table 2. The titanium dioxide pigment (Sample A) obtained by the present process has substantially equivalent whiteness and color tone to those in the case of no coating treatment with an alkylsilane compound (Sample G). It seems that discoloration even by heating at drying or pulverization is hard to occur because of the excellence of the heat resistance.

TABLE 2

| Example | Sample | L | B |
|---|---|---|---|
| Ex. 1 | A | 98.5 | 1.3 |
| Comp. Ex. 1 | G | 98.6 | 1.1 |
| Comp. Ex. 6 | L | 98.0 | 1.8 |

INDUSTRIAL APPLICABILITY

The present process provides titanium dioxide pigment with distinguished hydrophobic property, dispersibility and heat resistance. The titanium dioxide pigment is useful as a colorant for plastics, especially useful in the field of thin film processing requiring a lacing resistance. Furthermore, the present resin composition can give moldings substantially free from processing failures such as lacing, pinholes or projection of poorly dispersed particles of titanium dioxide pigment from the molding surfaces and thus with distinguished surface smoothness and gloss.

The invention claimed is:

1. A process for producing titanium dioxide pigment, which comprises a step of coating a hydrolysis product of an alkylsilane compound represented by the following formula (1):

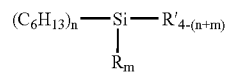

(where R is an alkyl group having 5 or less carbon atoms, R' is a hydrolyzable group, and n is an integer of 1 to 3, m is an integer of 0 to 2, and n+m≦3) by dry processing on surfaces of particles of titanium dioxide pigment
    wherein the particles of the titanium dioxide pigment is obtained by pulverization of titanium dioxide pigment in a fluid energy pulverizer; and
    wherein the fluid energy pulverizer uses a gas as a pulverizing medium and the hydrolysis product of the alkysilane compound represented by the formula (1) is added to the pulverizer during the pulverization of the titanium dioxide pigment.

2. A process for producing titanium dioxide pigment according to claim 1, wherein R' is a methoxy group or an ethoxy group.

3. A process for producing titanium dioxide pigment according to claim 1, wherein the fluid energy pulverizer uses steam as a pulverizing medium, and the alkylsilane compound represented by the formula (1) is added to the pulverizer during the pulverization of the titanium dioxide pigment.

4. A process for producing titanium dioxide pigment according to claim 1, wherein the dry processing is carried out at 120° to 300° C.

5. A process for producing titanium dioxide pigment according to claim 1, wherein the hydrolysis product of the alkylsilane compound is subjected to dry processing in an amount ranging from 0.01 to 3.0 wt. % in terms of the alkylsilane compound on the basis of the titanium dioxide pigment.

6. A process for producing titanium dioxide pigment according to claim 1, wherein the titanium dioxide pigment is coated with an inorganic compound in advance.

7. A process for producing titanium dioxide pigment according to claim 6, wherein the inorganic compound is hydrated oxide of aluminum.

8. A process for producing titanium dioxide pigment according to claim 7, wherein the hydrated oxide of aluminum is coated in an amount ranging from 0.01 to 1.0 wt. % in terms of $Al_2O_3$ on the basis of the titanium dioxide pigment.

9. A process for producing titanium dioxide pigment, according to claim 1, wherein the titanium dioxide pigment has a dispersibility of not more than 20 kg/cm$^2$.

10. A process for producing a resin composition, which comprises mixing the titanium dioxide pigment obtained by the process according to claim 1, with a molten plastic resin with a kneader.

11. A process for producing titanium dioxide pigment according to claim 3, wherein the dry processing is carried out at 120° to 300° C.

* * * * *